(12) United States Patent
Barber (10) Patent No.: US 10,206,377 B2
(45) Date of Patent: Feb. 19, 2019

(54) AQUAPONICS SYSTEM AND METHOD THEREOF

(71) Applicant: Glynn Barber, Redkey, IN (US)

(72) Inventor: Glynn Barber, Redkey, IN (US)

(*) Notice: Subject to any disclaimer, the term of this patent is extended or adjusted under 35 U.S.C. 154(b) by 538 days.

(21) Appl. No.: 14/425,412

(22) PCT Filed: Sep. 6, 2013

(86) PCT No.: PCT/US2013/058619
§ 371 (c)(1),
(2) Date: Mar. 3, 2015

(87) PCT Pub. No.: WO2014/039904
PCT Pub. Date: Mar. 13, 2014

(65) Prior Publication Data
US 2015/0230438 A1 Aug. 20, 2015

Related U.S. Application Data

(60) Provisional application No. 61/697,641, filed on Sep. 6, 2012.

(51) Int. Cl.
*A01G 31/00* (2018.01)
*A01K 63/04* (2006.01)
(Continued)

(52) U.S. Cl.
CPC ............ *A01K 63/045* (2013.01); *A01G 31/00* (2013.01); *A01G 31/02* (2013.01); *A01K 31/00* (2013.01);
(Continued)

(58) Field of Classification Search
USPC .................. 47/59 R, 62 R, 62 C–63 C, 66.6; 119/246, 226, 227, 247, 260
See application file for complete search history.

(56) References Cited

U.S. PATENT DOCUMENTS 3,605,697 A * 9/1971 Szekely ................. A01K 61/85
                                                        119/51.11
3,660,933 A * 5/1972 Wong, Jr. ............... A01G 31/02
                                                        239/428.5
(Continued)

FOREIGN PATENT DOCUMENTS

JP          03127925 A      5/1991
JP          08131018 A      5/1996
JP          1998-575855  *  1/1997 ............. A01K 63/00

OTHER PUBLICATIONS

"International Preliminary Report on Patentability"; dated Mar. 10, 2015; 1 page; Issued by the International Bureau of WIPO.
(Continued)

*Primary Examiner* — Andrea M Valenti
(74) *Attorney, Agent, or Firm* — Taft Stettinius & Hollister LLP; Stephen F. Rost (57) ABSTRACT

Disclosed is an aquaponics system with minimal outflows of waste. A stream of waste water from aquatic animals is mineralized in a waste conversion unit having algae and bacteria located on multiple horizontal plates through which the stream of waste water flows. The stream of waste leaving the waste conversion unit passes through troughs upon which plants are hydroponically grown by absorbing the mineralized waste. The water leaving the troughs is returned to the tank holding the aquatic animals and the cycle is repeated. The system may be augmented with an air source, a light source, and a nutrient source in the waste conversion unit to further enhance the breakdown of the animal waste. Additionally, floating trays may be utilized in the troughs to support a wide range of plants hydroponically grown in the troughs.

9 Claims, 7 Drawing Sheets

(51) Int. Cl.
  *B01D 35/02* (2006.01)
  *A01G 31/02* (2006.01)
  *A01K 61/10* (2017.01)
  *A01K 63/00* (2017.01)
  *A01K 31/00* (2006.01)

(52) U.S. Cl.
  CPC ............ *A01K 61/10* (2017.01); *A01K 63/003* (2013.01); *B01D 35/02* (2013.01)

(56) References Cited

U.S. PATENT DOCUMENTS

| | | | | | |
|---|---|---|---|---|---|
| 3,973,519 | A * | 8/1976 | McCarty | ................ | A01K 63/04 119/227 |
| 4,255,896 | A * | 3/1981 | Carl | ................ | A01G 31/06 47/62 C |
| 4,607,454 | A * | 8/1986 | Koike | ................ | A01G 31/02 47/63 |
| 4,698,936 | A * | 10/1987 | Helfman | ................ | A01G 9/02 47/40 |
| 4,851,112 | A * | 7/1989 | Schlensker | ................ | A01K 63/045 119/260 |
| 4,926,586 | A * | 5/1990 | Nagamatsu | ................ | E04D 11/002 47/65.9 |
| 4,978,450 | A * | 12/1990 | Drori | ................ | B01D 25/26 210/488 |
| 5,176,100 | A * | 1/1993 | Fujino | ................ | A01K 63/04 119/227 |
| 5,301,465 | A * | 4/1994 | Caferro | ................ | A01G 9/022 47/65.8 |
| 5,536,398 | A * | 7/1996 | Reinke | ................ | A01K 63/045 119/260 |
| 5,736,034 | A * | 4/1998 | Phillips | ................ | A01K 63/04 210/167.26 |
| 5,863,426 | A * | 1/1999 | Yen | ................ | A01K 63/045 210/167.22 |
| 6,065,245 | A * | 5/2000 | Seawright | ................ | A01G 31/00 119/200 |
| 6,209,260 | B1 * | 4/2001 | Surette | ................ | A01G 9/02 47/65.5 |
| 6,665,964 | B2 * | 12/2003 | Klotz | ................ | G09F 19/08 40/406 |
| 6,751,903 | B2 * | 6/2004 | Shryock | ................ | A01G 9/00 47/59 R |
| 7,378,019 | B1 * | 5/2008 | Currier | ................ | B01D 24/165 210/289 |
| 8,033,250 | B2 * | 10/2011 | Calinski | ................ | A01K 61/70 119/208 |
| 8,291,640 | B2 * | 10/2012 | Kloas | ................ | A01G 31/02 47/62 R |
| 8,677,686 | B1 * | 3/2014 | Nelson | ................ | A01G 31/02 47/62 R |
| 8,677,942 | B2 * | 3/2014 | Bodlovich | ................ | C02F 3/32 119/226 |
| 8,910,418 | B2 * | 12/2014 | Khoo | ................ | A01G 9/00 47/59 R |
| 9,043,997 | B2 * | 6/2015 | Agresta | ................ | A01K 63/045 |
| 2006/0049086 | A1 * | 3/2006 | Axelrod | ................ | A01K 63/045 210/167.21 |
| 2008/0098506 | A1 * | 5/2008 | Mjelde | ................ | E04H 4/1218 4/507 |
| 2009/0056067 | A1 * | 3/2009 | Wen | ................ | B08B 5/02 15/405 |
| 2009/0301399 | A1 * | 12/2009 | Brown | ................ | A01G 31/02 119/226 |
| 2010/0031893 | A1 | 2/2010 | Bodlovich et al. | | |
| 2011/0131880 | A1 | 6/2011 | Kloas et al. | | |
| 2013/0232872 | A1 * | 9/2013 | Bryan, III | ................ | A01G 31/02 47/62 C |

OTHER PUBLICATIONS

"Written Opinion of the International Searching Authority"; dated Nov. 27, 2013; 5 pages; issued by the Korean Intellectual Property Office.

"International Search Report"; dated Nov. 27, 2013; 3 pages; Issued by the Korean Intellectual Property Office.

* cited by examiner

FIG. 28

AQUAPONICS SYSTEM AND METHOD THEREOF

This application is a U.S. national stage application under 35 U.S.C. § 371 of PCT International Application Serial No. PCT/US2013/058619, which has an international filing date of Sep. 6, 2013, and designates the United States of America, and which claims priority to U.S. Provisional Application Ser. No. 61/697,641, filed Sep. 6, 2012. The disclosure of these prior applications are hereby expressly incorporated by reference in their entirety.

REFERENCE TO RELATED APPLICATION

This application claims priority to U.S. Provisional Application 61/697,641 entitled Aquaponics System and Method Thereof filed Sep. 6, 2012 by Glynn Barber, the entire contents of which are herein incorporated by reference.

FIELD OF THE INVENTION

The present invention relates to a food supply system, and in particular, to a aquaponics system and method of growing food through the absence of pesticides.

BACKGROUND

In today's world, the natural and organic food market is increasing and the growth of production has been unable to keep up with demand. For instance, in the United States, sales of organic food and beverages have grown from $1 billion in 1960 to $26.7 billion in 2010. Sales in 2010 represented 7.7% growth over 2009 sales. Organic fruits and vegetables have experienced the highest growth in sales during 2010 up nearly 11.98% over 2009 sales.

In light of these sales, there is concern about shortages in the food supply around the world, particularly with respect to natural and organic foods. Moreover, safe, natural, organic, sustainable and nutritional foods are in severe shortage worldwide. Much of this is due to an increase in the global population, and the United States is not immune to this population growth. There is at least one prediction that a major shortage in the food supply will take place by the year 2050.

To eliminate those natural and organic food shortages, there is a need to establish a position in the market and capture the attention of those that desire these foods and meet their wants and needs. Further, there is a need to be able to produce fruits and vegetables year round, putting food suppliers at an advantage over those that can only grow their fruits and vegetables, for example, three seasons out of the year and/or import them during non-growing periods in their region. Moreover, it is desirable to produce food at prices that are similar to or less than non-organic food prices.

SUMMARY

Disclosed is an aquaculture system with minimal outflows of waste. A stream of waste water from aquatic animals is mineralized in a waste conversion unit having algae and bacteria located on multiple horizontal plates through which the stream of waste water flows. The stream of waste leaving the waste conversion unit passes through troughs upon which plants are hydroponically grown by absorbing the mineralized waste. The water leaving the troughs is returned to the tank holding the aquatic animals and the cycle is repeated. The system may be augmented with an air source, a light source, and a nutrient source in the waste conversion unit to further enhance the breakdown of the animal waste. Additionally, floating trays may be utilized in the troughs to support a wide range of plants hydroponically grown in the troughs.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figures 1, 2, 3:
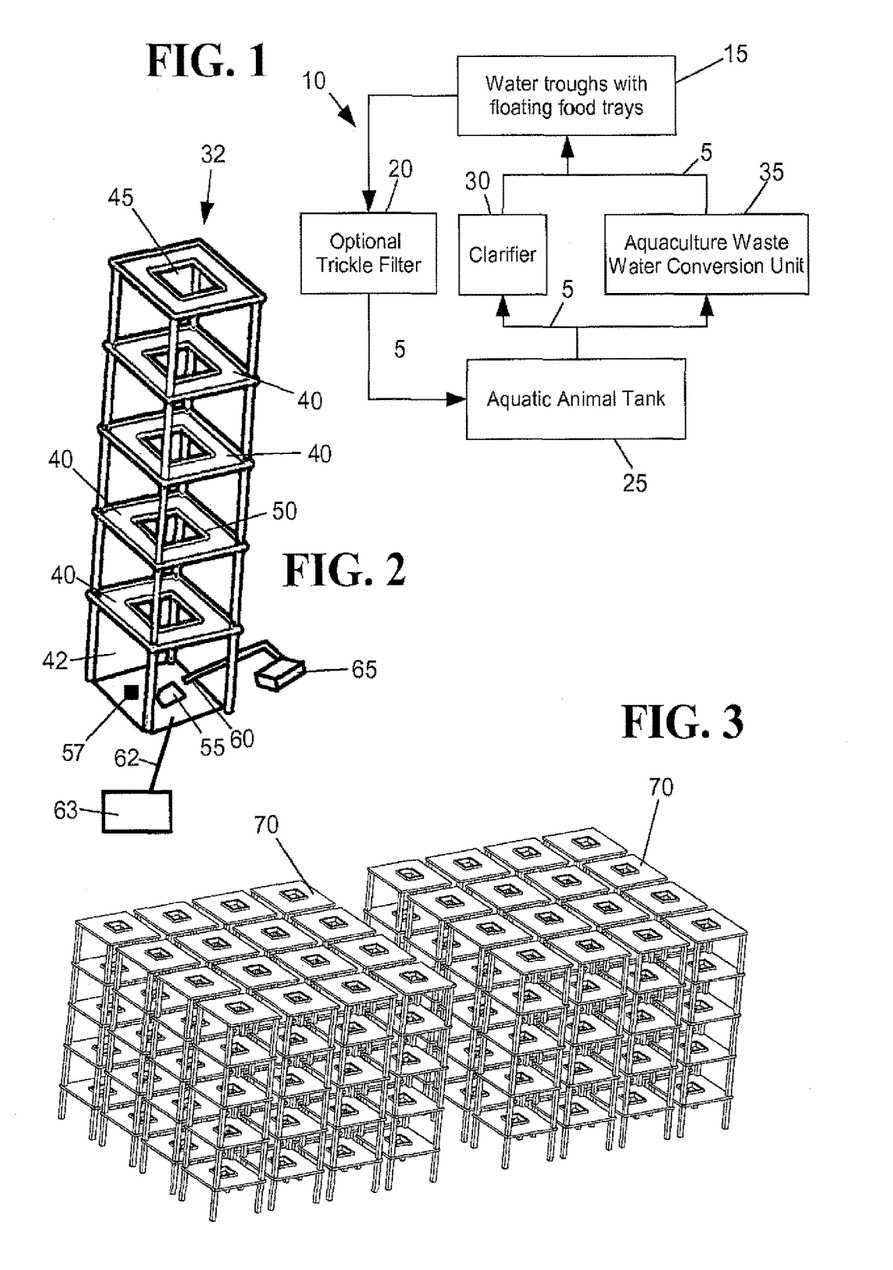
FIG. 1 is a schematic diagram illustrating the flow of water through the system.
FIG. 2 is a perspective view of a stack of horizontal plates within a waste water conversion unit.
FIG. 3 illustrates an array of stacks within an aquaculture waste water conversion unit.

Referring to FIG. 1, the aquaponics system 10 includes a circuit of water 5 flowing from water troughs 15 or gutters, upon which food trays float, to a trickle filter 20 and then on to an aquatic animal tank 25 that includes animals such as fish or other sea life. From the aquatic animal tank 25, the water flows to either a clarifier 30 or an Aquaculture Waste Water Conversion (AWWC) unit 35 and then back to the water troughs 15. The clarifier 30 and AWWC 35 are collectively referred to as waste conversion units.

In one embodiment, the aquatic animal tank 25 is a substantially circular tank of approximately 24 foot diameter and the animal product produced in the aquatic animal tank can include different types of fish including yellow perch, bluegill, tilapia, etc. In other embodiments, rectangular or other shapes may be utilized for storage and growth of the aquatic animals. In yet another embodiment the aquatic animal tank 25 may be a lined and enclosed holding pond dug into the ground. In some embodiments, there can be several tanks disposed within the system, with each tank including a specific type of fish. In any case, the fish can be fed any type of conventional fish food. Each system is capable of raising 40-50 thousand pounds per year of fish.

From the aquatic animal tank 25, the water 5 flows to either a clarifier 30 or an AWWC unit 35. Valves and other control devices are utilized to regulate the flow of water to the clarifier or AWWC. Utilizing both a clarifier 30 and an AWWC 35 either in parallel or in series is within the scope of the present invention, however in exemplary embodiments only a clarifier 30 or an AWWC 35 is utilized.

FIG. 2 shows an example of the interior of a shelf 32 of an AWWC 35 or clarifier 30 unit. The shelf 32 includes a plurality of vertically stacked horizontal plates 40 which have holes 45 through which the circuit of water 5 may flow. The water flowing from the aquatic animal tank 25 flows into the bottom 42 of the shelf 32 and flows upwards through the holes 45 in the horizontal shelves 40. Surrounding each hole 45 is a ridge 50 which acts to help keep a portion of the animal waste on the horizontal plate 40. In the illustrated example, the plates are approximately one foot by one foot square. In the illustrated example, the horizontal plates are spaced approximately six inches from each other. Algae, such as Fog Free Technologies FFT-100 algae, and bacteria within the AWWC 35 rest upon and act upon the animal waste retained on the horizontal plates 40. A number of methods may be utilized to establish the algae and bacteria levels needed in the AWWC to breakdown fish waste. One method of establishing the algae and bacteria is to utilize an organic fish emulsion fertilizer to cause an algae bloom followed by a shading of the system to kill most of the algae and establish the bacteria.

A lamp 55 located at the bottom of the shelf 32 supplies light which promotes the algae's decomposition of the animal waste. The lamp 55 is preferably on a timer that cycles through an optimized day/night cycle that may be longer, shorter, or equal to 24 hours. The lamp 55 preferably emits a range of light with wavelengths readily utilized by the algae of the system. The horizontal plates 40 may be constructed from Polyvinyl chloride (PVC) and in an exemplary embodiment the horizontal plates are an eighth of an inch thick and only minimally absorb the wavelengths of light provided by the lamp 55. A heater 57 acts to regulate the temperature of water to control the breakdown of animal waste by the algae. In one embodiment, the heater acts to maintain the temperature of the water between 50 and 95 degrees Fahrenheit (10 and 35 Celsius). In an exemplary embodiment, the temperature of the water in the AWWC or clarifier is maintained at 82 Fahrenheit (27.7 Celsius).

At the bottom of the shelf 32 a bubbler 60 provides a steady stream of air or oxygen bubbles from a gas source 65. The clarifier 30 is distinct from the AWWC in that the clarifier does not include a bubbler 60. The bubbles flow to the top of the AWWC 35 and help to oxygenate the water in the AWWC which facilitates the mineralization of the animal waste by the algae. In an alternate embodiment, the holes 45 of the horizontal plates 40 are staggered in their location to increase the path length of the bubbles traveling through the shelf 32. In one embodiment, the gas source 65 is a canister of compressed oxygen that provides pure oxygen bubbles to the system. In an alternate embodiment, the gas source 65 is an air compressor that utilizes ambient air to form bubbles in the AWWC 30. In yet another variation, the gas source 65 is both an air compressor and a canister of compressed gas wherein the canister or compressed gas is utilized as a backup in the event the compressor malfunctions or there is a loss of electrical power to the compressor. In addition to oxygen being provided to the AWWC, a nutrient fluid 62 is pumped from a container 63 to the AWWC to further facilitate the breakdown of animal waste.

FIG. 3 illustrates two four by four arrays 70 of shelves 32 forming an AWWC 35. The arrays 70 may be as large as necessary to treat the water flowing from the aquatic animal tank 25. The arrays 70 of the system may be configured so that the water from the aquatic animal tank 25 flows to the arrays in series such that each subsequent array treats water that is cleaner than the array before. Alternatively, the arrays may be arranged in parallel to minimize the flow rate of water through the AWWC or clarifier. Above the arrays 70 of shelves 32 in the AWWC 35, a mesh screen (not pictured) is positioned to prevent large solid waste from entering the water troughs 15. In an exemplary embodiment of the invention, the mesh screen has a 20 micron weave to prevent large solids from entering the water troughs 15. In one embodiment, the flow rate of water through the AWWC is 100 gallons per minute.

Figures 4, 5, 6:
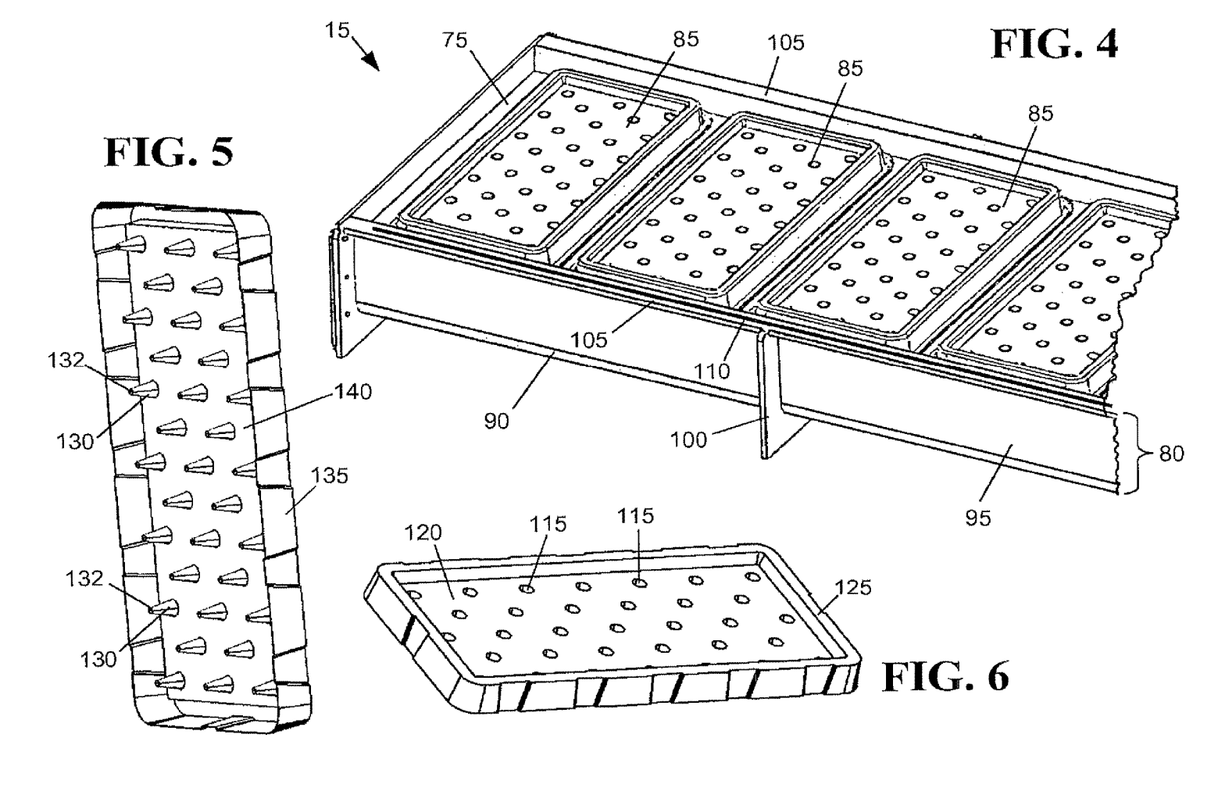
FIG. 4 shows a partial perspective view of a trough with four trays floating on 12 inches of water.
FIG. 5 shows a lower perspective view of a first design of a tray.
FIG. 6 shows an upper perspective view of the first design of a tray.
Figure 7:
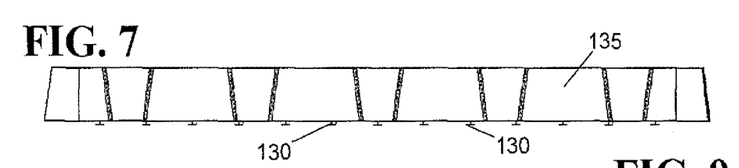
FIG. 7 shows a side view of the first design of a tray.
Figure 8:
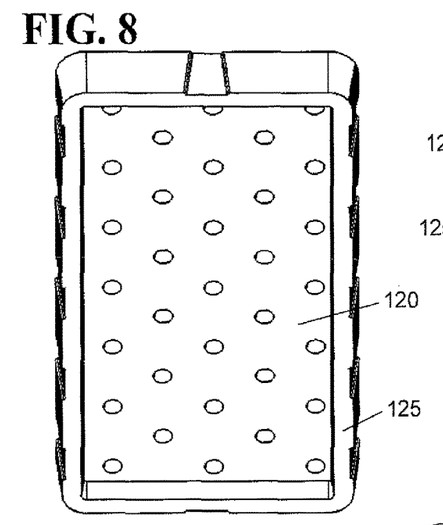
FIG. 8 shows a top perspective view of the first design of a tray.
Figure 9:
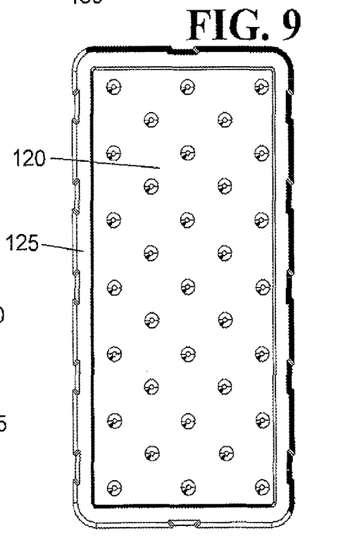
FIG. 9 shows a top view of the first design of a tray.

The circuit of water 5 flows from the clarifier 30 and/or AWWC 35 to the water troughs 15. The troughs are preferably constructed of FDA approvable fiberglass resin or of blow molded polypropylene. As shown in FIG. 4, the troughs 15 have a basin 75 with a height 80 of between 12 and 24 inches through which the circuit of water flows and in which trays 85 are configured to float. The troughs 15 are constructed of multiple modular sections (90 and 95) that are bolted together at seams 100. In one embodiment, the width of the basin area is four feet across and each modular section is 10 feet long. In another embodiment, the basin area is eight feet across. Plants are grown in the troughs upon the trays. A portion of the plants (the roots) extend through the tray into the water that is part of the circuit of water described in FIG. 1 while a portion of the plants are supported above the water by the trays. Examples of plant products that may be grown upon the trays include tomatoes, cucumbers, lettuce. Numerous modular sections may be bolted together to form a single long trough. The seam portions also act as stands for the troughs and provide an air gap between the trough and the ground below which helps to regulate the temperature of the water in the basin area 75. Additional insulative material may be added between the troughs and the ground below to limit heat transfer to or from the system. As shown in FIG. 4, the separation of the two walls of the troughs (322 and 323, highlighted in FIGS. 23 and 24) is substantially equal to the length of the trays 85.

The ends of the troughs may also be constructed of a fiberglass or other materials similar to the modular sections of the troughs. The ends of the troughs also include a seam portion that is configured to be bolted or glued to the seams of the modular trough sections. A marine grade silicone may be utilized between the seams of the troughs to help make the system watertight.

The troughs also include lipped edges 105 above the basin area 75 on which an automatic harvester may ride. In an alternate embodiment, a linear rail or track 110 is secured above the lipped edges 105 and the harvester rides upon the linear rail 110.

Inside the troughs 15, a scavenging crustacean such as the Cherax Quadricarantus (i.e., Australian Red Claw crayfish) may be located below the trays 85 in the circuit of water 5 to remove dead roots of plants that have been harvested and any roots that become damaged while the plant is growing. The scavenging animals within the troughs also act as a trace mineral delivery system for the plants growing in the trays. A 157,000 gallon system has been shown to provide between 18,000-24,000 pounds of crayfish annually.

FIGS. 5 through 9 illustrate an example of a tray 85 configured to float in a trough 15. The tray 85 includes a plurality of cup areas 115 into which plants may be placed. The tray includes a substantially flat top 120 surrounded by a raised lip 125. From the raised lip 125 a beveled skirt 130 extends downwards. The cup areas 115 are formed by tapered cone regions 130 or cones extending down from the flat top 120. In the illustrated example, the tapered cone regions 130 and the beveled skirt 135 extend downwards to approximately the same elevation, however it should be appreciated that the skirt and the cone regions may be shortened or lengthened based on the desired application. For example, certain plants may grow better in trays that have deeper cone regions. As highlighted in FIG. 9, in the illustrated example, the cup areas 115 are arranged such that they run parallel to and adjacent to the long sides (top and bottom in the picture) of the raised lip 125. Maximizing the number of cup areas 115 located adjacent to the raised lip 125 helps to spread out the plants and thus increases the amount of light that each plant is able to capture by reducing shading from other plants.

Figures 10, 11:
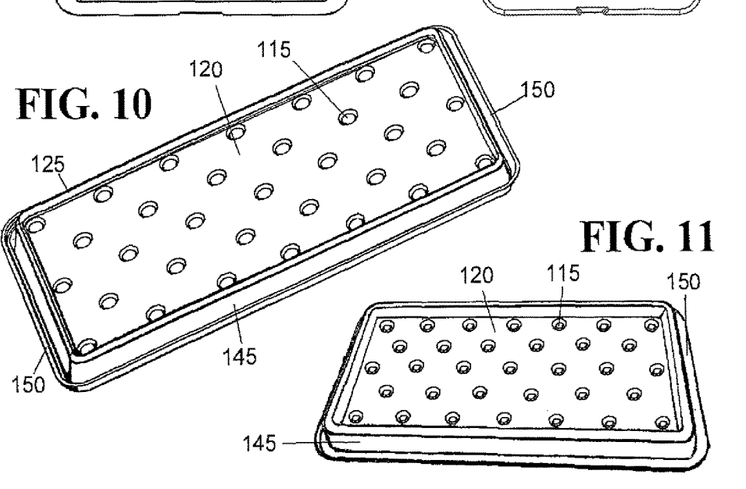
FIG. 10 shows a perspective view of a second design of a tray.
FIG. 11 shows another perspective view of the second design of a tray.

The flat top 120, the cone regions 135, the raised lip 125, and the beveled skirt 135 form an air bubble region 140 in which air is trapped to provide buoyancy for the tray 85 floating in the trough. The tray 85 surrounding the air bubble region 140 is substantially air tight in that when supporting the weight of floating plants, the slightly pressurized air within the air bubble region 140 is unable to escape. The floating trays 85 may optionally be equipped with buoyancy assistors (such as closed cell foam) secured in the air bubble region 140 or upon the flat top 120. In the event that the tray 85 becomes cracked or otherwise develops an air leak, the buoyancy assistors temporarily prevent the tray and the plants supported by the tray from becoming fully submerged in the basin area of the trough. The various portions of the trays (flat top 115, beveled skirt 135, etc.) have substantially similar thicknesses which allows for the multiple trays to be nested in a compact stack for transport of the trays FIGS. 10 and 11 illustrate another embodiment of a tray 85 in which the beveled skirt has been replaced with a smooth skirt 145 extending downward from the raised lip 125. Additionally, the smooth skirt 145 includes an upward flange 150 that extends from the lowest portion of the skirt. The upward flange 150 helps improve the rigidity of the skirt as well as assisting in maintaining a desired spacing between the trays 85 floating in a trough 15.

In one example, the trays have a width of two feet and length of slightly less than four feet so that they may be floated within the basin area 75 of the troughs. In one example, each cup area has a diameter of two inches at the upper opening of the cup area, a lower opening 5 inches below the upper opening, and a tapered cone contour between the upper and lower openings. The lower opening 132 is preferably of small size to prevent a germinating seed from dropping down from the tray into the basin area while also large enough as to not constrict a main root or a tap root of a fully mature plant. Based on the variety of plants to be grown the diameter and size of the cup area of the tray may be increased or decreased. Additionally, based on the variety of plants to be grown the spacing of the cup areas on the tray may be increased or decreased. In one embodiment, a 2 foot by 4 foot tray includes 33 cup areas for growing 33 plants, with each plant having approximately one quarter square foot of horizontal area.

From the troughs 15, the circuit of water 5 flows back to the aquatic animal tank 25. In one embodiment, the system includes an optional trickle filter 20 located in the water flow between the troughs and the aquatic animal tank 25 that includes a plurality of adsorbent materials such as rocks, lava, coke, gravel, slag, polyurethane foam, sphagnum peat moss, ceramic, or plastic media over which the water flows.

Figure 12:
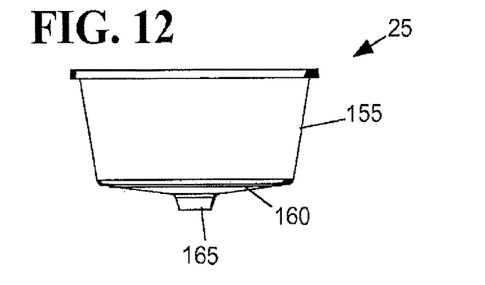
FIG. 12 shows a side view of an aquatic animal tank.
Figure 13:
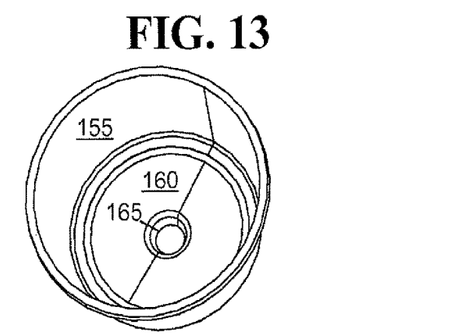
FIG. 13 shows a top perspective view of an aquatic animal tank.

FIGS. 12 and 13 illustrate an example of an aquatic animal tank 25 with a circular wall 155 and a tapered bottom 160 leading to a bottom drain 165. The aquatic animal tank 25 is preferably constructed of an FDA approvable material with minimal leaching into the water located in the tank. In one example, the tank holds approximately 800 gallons of water and 200 tilapia fish. The tapered bottom 160 of the tank helps to direct animal waste into the drain 165 which leads to the clarifier or AWWC. Based on the type of fish and the water level of the aquatic animal tank 25 a mesh netting may be placed over top of the tank to prevent the animals from escaping from the tank. In another embodiment, a fence extends upwards from and fully encircles the top of the circular wall of the aquatic animal tank 25.

Figures 14, 15, 16, 17, 18, 19, 20:
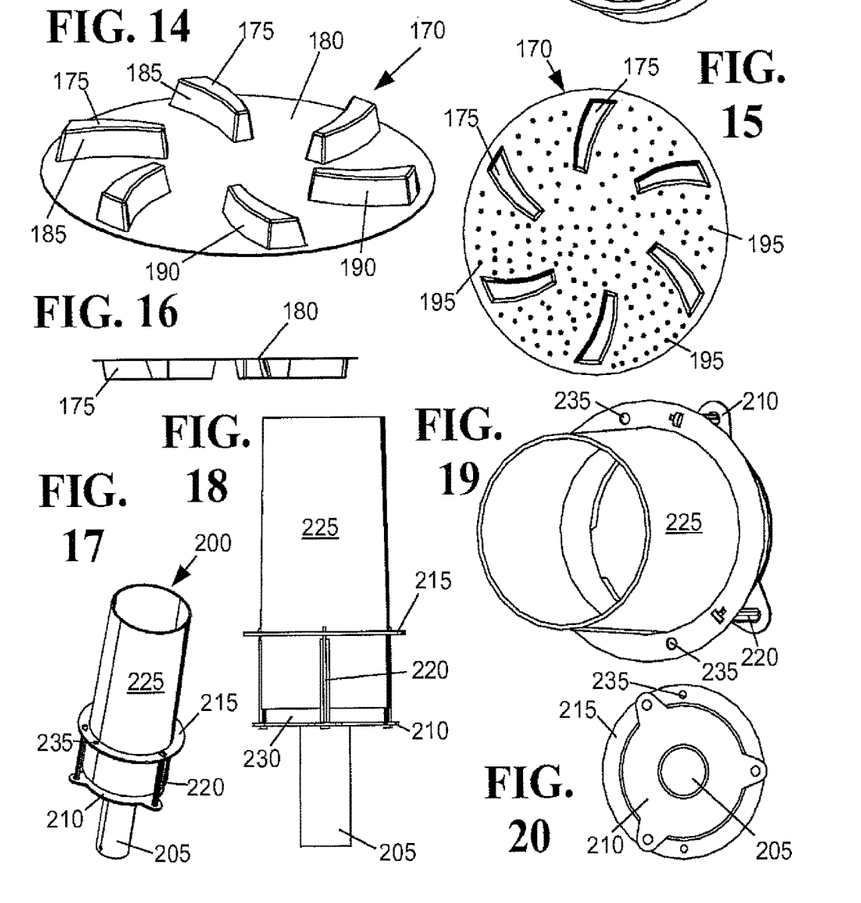
FIG. 14 shows a perspective view of a circular vortex drain attachment with vortex fins.
FIG. 15 shows a bottom view of a circular vortex drain attachment for an aquatic animal tank.
FIG. 16 shows a side view of a circular vortex drain attachment.
FIG. 17 shows a side perspective view of an automatic feeding device.
FIG. 18 shows a side view of an automatic feeding device.
FIG. 19 shows a top perspective view of an automatic feeding device.
FIG. 20 shows a bottom view of an automatic feeding device.

FIGS. 14 through 16 illustrate an example of a circular vortex drain attachment 170 having a plurality of water directing fins 175 extending from a flat base 180. The fins 175 have a concave side 185 and a convex side 190 and are angled relative to the center of the vortex drain attachment to direct the water in a vortex flow to the drain 165 that helps reduce clogs in the drain as well as assisting in breaking up the animal waste. The vortex drain attachment 170 is configured to fit on the tapered bottom 160 of the aquatic animal tank 25 and in one example the vortex drain attachment 170 has a six foot diameter to match the diameter of the aquatic animal tank 25 and the fins 175 have a height of four inches. As with the trays, the vortex drain attachments may have a uniform thickness throughout the various features so that multiple vortex drain attachments may be stacked in a nested fashion for transport. As shown in FIG. 15, the flat base 180 of the vortex drain attachment 170 includes a plurality of openings 195 through which the circuit of water 5 flows to the drain. A mesh netting (not shown) may be placed over the openings to further restrict the size of objects that may pass to the drain. In one embodiment, the openings have a diameter of 1.5 inches and a circular mesh netting with $\frac{1}{16}^{th}$ of an inch holes is used over the over the openings to prevent small, recently hatched, fish from passing to the AWWC or clarifier. As the fish age and become larger, circular meshes with larger openings may replace the finer mesh to reduce the likelihood of the mesh becoming clogged by fish waste. Three quarter inch netting may be used with larger fish while quarter inch netting may be utilized as an intermediary size netting.

FIG. 17 through 20 illustrate an example of an automatic feeding system 200 for the aquatic animal tank 25. The automatic feeding system 200 includes a shaking device 205 attached to a flat base 210. A ring 215 is rigidly secured to the flat base 210 through posts 220 and a cylindrical feeder 225 is moveable up and down through the ring. The cylindrical feeder and flat base form a feed container with an adjustable opening. Movement of the cylindrical feeder 225 increases or decreases the size of the gap 230 between the flat base 210 and the cylindrical feeder 225 which allows for more or larger food to fall out from the feeder when the shaking device 205 is activated. The ring 215 may include apertures 235 through which string or rope may be attached to position the automatic feeding system 200 above the aquatic animal tank. The shaking device 205 may include a number of different vibrating systems. For example, the shaking device may include a rod with a weight on one side that spins when food is to be dispensed. Alternatively, the shaking device may include a weight that is moved up and down or side to side when food is to be dispensed. The shaking device 205 is connected to a timed controller that provides power to the shaking device at predetermined intervals.

In one embodiment, the controller connected to the shaking device also receives data from an optical sensor which measures ripples and disturbances (such as feeding fish) upon the surface of the water and adjusts the feeding schedule accordingly. For example, if the shaking device is activated and a large amount of disturbance is measured on the surface of the water (indicating feeding fish) the controller sets a timer and waits four minutes to activate the shaking device again. If the shaking device is activated and a large disturbance is not recorded on the surface of the water, the controller sets a longer timer and may wait four hours before activating the shaking device again.

Figures 21, 22, 23, 24:
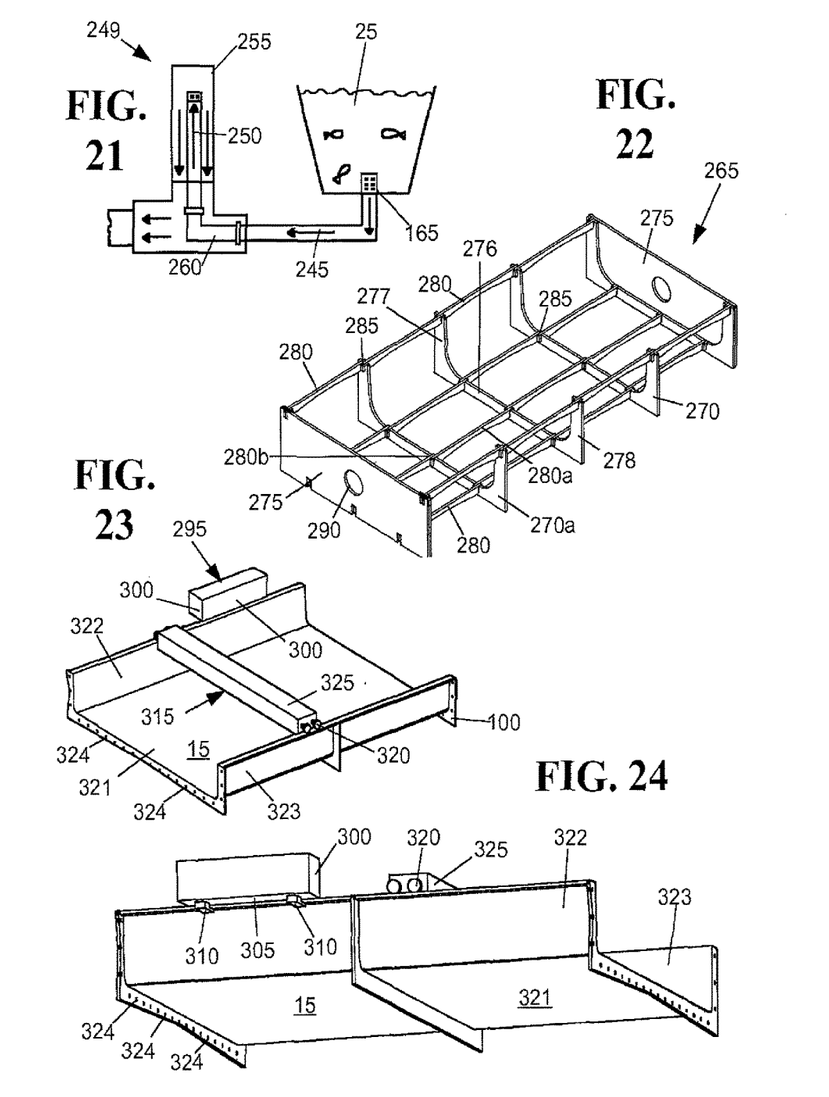
FIG. 21 shows a side view of a stand pipe between an aquatic animal tank and a waste water conversion unit.
FIG. 22 shows a perspective view of a collapsible trough made from interconnecting staves and U-slats.
FIG. 23 shows an upper perspective view of a trough having a side planter secured to a edged lip and an automatic harvester operating within the basin area of the trough.
FIG. 24 shows a lower perspective view of a side planter and an automatic harvester secured to a trough.

FIG. 21 illustrates an example of an adjustable water level control unit 249 with a stand pipe located between an aquatic animal tank 25 and an AWWC for maintaining the water level in the animal tank 25 and preventing the aquatic animal tank 25 from fully draining in the event that the pump providing water to the tank malfunctions or ceases operation. Water flows from the drain 165 in bottom of the animal tank 25 through a horizontal pipe 245 to an inner vertical pipe 250 located within a taller outer vertical pipe 255. As water is pumped from the troughs to the aquatic animal tank 25, the water level in the tank (and the inner vertical pipe 250) rises until the water level exceeds the height of the inner vertical pipe and flows down through the outer vertical pipe 255 between the inner vertical pipe 250 and outer vertical pipe 255. The inner vertical pipe 250 is removable for when the aquatic animal tank 25 is to be drained and is also vertically adjustable within the transition pipe 260 connected to the horizontal pipe 245. In one example, the connection between the transition pipe 260 and the inner vertical pipe 250 is a rubber O-ring that provides a substantially water tight seal but allows the inner pipe to be slid up and down. In another embodiment, the connection between the transition pipe 260 and the inner vertical pipe 250 is a course threaded screw that causes the vertical pipe to be raised or lowered by rotating the inner vertical pipe. By lowering the inner vertical pipe 245 further into the transition pipe 260, more water flows out of the aquatic animal tank 25 and the water level within the tank is lowered.

FIG. 22 illustrates an example of a collapsible trough 265 made of interlocking members that may be disassembled so that the trough may be shipped flat. In the illustrated example, three U-slats 270 are equally spaced between two end joints 275. The end joints 275 are made from a U-slat bound to an end board. The U-slats include a horizontal joist 276, below the circuit of water, and two studs (277 and 278) extending up from the horizontal joist 276 that flank the basin and the water within the trough. Between each of the end joints 275 and the U-slats 270 are five staves 280 that attach to cutout sections 285 or attachment points of the U-slats. All of the staves have an equal length. In the illustrated example, a first stave 280a is directly contacting and secured to a first U-slat 270a at a first end 280b of the first stave 280a. Four other staves extend between U-slats 270 that the first stave 280a extends between. All of the staves in the collapsible trough are substantially identical and all of the U-slats 270 are also substantially identical to simplify the assembly process. Additionally, by minimizing the number of unique components the manufacturing requirements of making the trough are reduced and extra components (such as one extra stave) can be sent with the trough to minimize the impact of damage in transit. The end boards of the end joints 275 include side openings 290 through which water may flow in and out of the troughs. Water impermeable FDA approvable plastic sheeting (not shown) is laid on the structure to hole the water of the system. Clamps on the uppermost staves may be added to secure the plastic sheeting to the trough structure.

FIGS. 23 and 24 illustrate an example of a trough 15 with a side planter 295 secured to a lipped edge 105 of the trough 15. The side planter 295 includes screen sides 300 that allow water to flow out of the side planter. The water impermeable bottom structure 305 of the side planter is sloped towards the trough so that water added to the side planter flows into the through. Clamps 310 under the bottom structure 305 secure the side planter 295 to the trough 15. The side planter is filled with water impermeable pellets, such as small quartz crystals and rooting vegetables such as carrots are grown in the side planter. The screen sides 300 preferably have a mesh weave that prevents the impervious material from entering the water of the trough. A timed water pump (not shown) draws water from the trough, the AWWC or the aquatic animal tank at regular intervals to provide water and nutrients for the rooting vegetables. In an exemplary embodiment, rooting vegetables, such as carrots and beats are grown within the pellets of the side planter.

Also shown in FIGS. 23 and 24 is an automatic harvester 315 with wheels 320 on the lipped edges 105 of the trough 15. The automatic harvester 315 includes a harvesting section 325 having a width slightly less than the width of the through and designed to harvest plants grown in floating trays in the basin area of the troughs. In one embodiment, the harvesting section 325 is a conveyor belt that cuts the harvested vegetables and transfers them to storage container (not shown). After the plants have been cut by the harvester, the unharvested roots of the plants fall down into the water of the trough, die, and may be eaten by scavenging creatures within the troughs, such as the Australian Red Claw crayfish.

The troughs shown in FIGS. 23 and 24 have basins 75 with flat bottoms 321 and a first wall 322 and a second wall 323 extending upward from the flat bottom. The seam 100 of the modular units is secured to and directly contacts the flat bottoms 321 and the walls (322 and 323) of the basin. The seam 100 also includes a plurality of holes 324 through which a mechanical fastener may be secured. When multiple modular units are secured together, mechanical fasteners are threaded through the seams of the two units to press the seams together and form a water tight seal. Additionally, a sealant between the seams of the two units may be utilized to further improve the water tightness of the trough.

Figure 25:
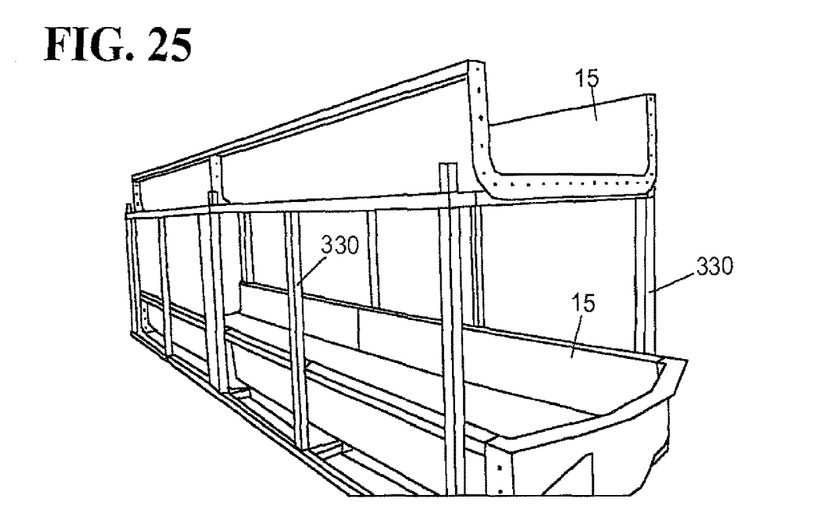
FIG. 25 shows a perspective view of a trough stacked upon another trough.

FIG. 25 illustrates an example of troughs 15 (or gutters) stacked with a support framework structure 330, such as a trellis of interlocking galvanized two inch square pipe. In an exemplary embodiment, an upper trough is directly provided with water from an AWWC and water overflows the upper trough down to a lower trough that is located three feet below the upper trough. Multiple methods may be utilized to regulate the water levels in the upper and lower troughs. In a first example, each of the upper and lower troughs include an overflow port located between 6 and 18 inches from the bottom of the basin area of the trough through which water overflows to either lower trough or another part of the system. The troughs may also utilize a bottom drain located in the bottom of the trough through which water flows to an adjustable elevation stand pipe and onto another trough or another part of the system. The use of a bottom drain as opposed to an overflow port allows for the water level of the trough to be more finely controlled and also facilitates draining the troughs if maintenance needs to be done on the system.

If multiple layers of troughs are utilized, growing lights may be suspended down from the upper trough to compensate for the shading of the lower trough and trays within the lower trough done by the upper trough. Additionally, the support framework structure may include portions that extend above the uppermost trough upon which grow lights may be suspended to provide additional light to the trays in the upper trough. If the system is utilized in a high latitude location during the winter, the additional light may be required to successfully grow certain plants.

Figures 26, 27:
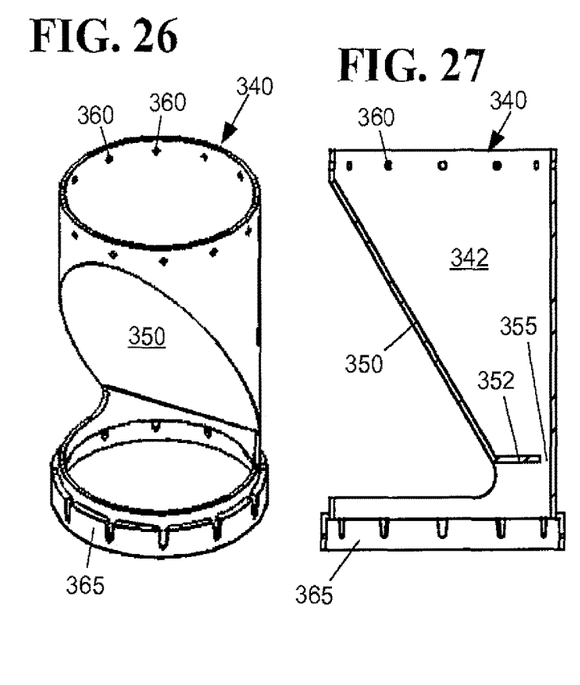
FIG. 26 shows an interlocking unit of a tower planter.
FIG. 27 shows a cross sectional view through the interlocking unit of FIG. 26.
Figure 28:
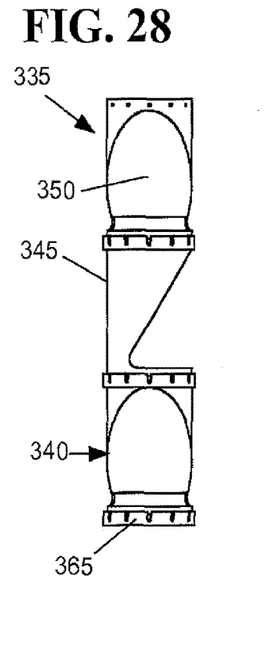
FIG. 28 shows a tower planter with three interlocking units.

FIGS. 26 through 28 illustrate an example of a snap together tower planter 335 made up of interlocking units 340 secured together. Each interlocking unit includes a plant 342 area bounded by a rounded vertical wall 345 and a flat angled wall 350 that tapers downwardly tapers towards the rounded vertical wall. A catch 352 extends from the bottom of the tapered wall towards the rounded wall, but does not fully reach the vertical wall. A small opening 355 between the catch 352 and the vertical wall 345 allows water to flow down out of the plant area 342 to a lower interlocking unit 340. The opening 355 is sufficiently small to limit the roots of the plant in the plant area 342 from extending down to a lower interlocking unit 340. Above angled wall 350, the interlocking unit 345 has circular opening surrounded by a ring of protrusions 360. Below the catch is another opening and a ring of latches 365 configured to latch onto the ring of protrusions of another interlocking unit. Pressing the protrusions of one unit into the ring of latches of another unit and twisting the units relative to each other causes the protrusions to be secured in the ring of latches and secures together the units. Multiple interlocking units may be secured together to create tower planters as tall as desired by a user. Water may be withdrawn from any part of the system to provide water to the tower planters. In one embodiment, the tower planters are filled with an impervious material similar to the material used in the side planters and both planters are watered on a regular schedule by a single timed watering device.

Figure 29:
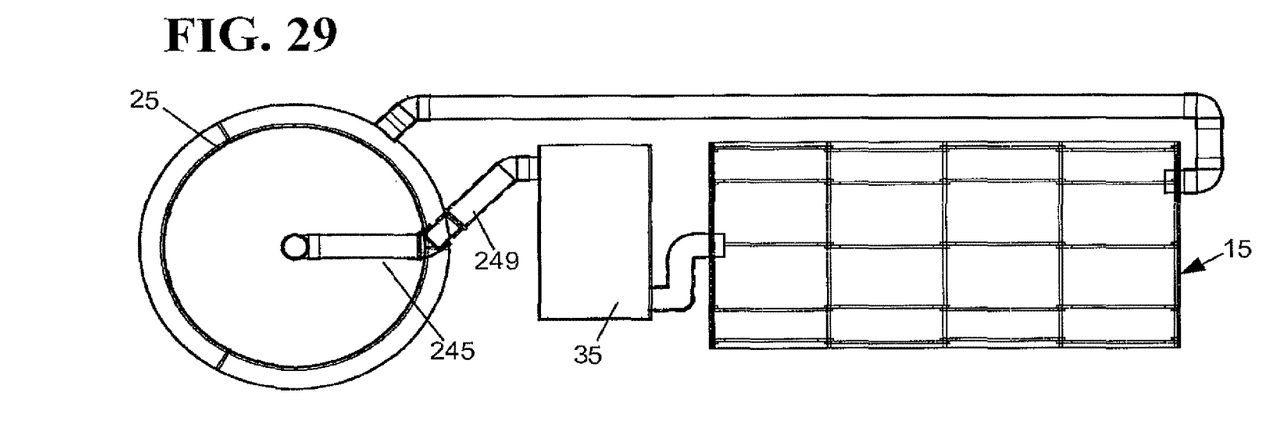
FIG. 29 shows a top view of a complete aquaponics system.
Figure 30:
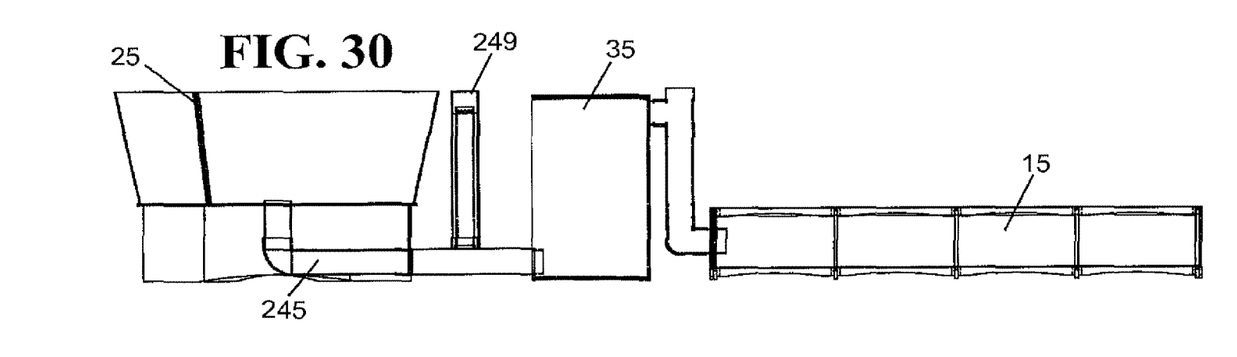
FIG. 30 shows a side view of a complete aquaponics system.

FIGS. 29 and 30 illustrate an example of an aquaponics system with a circuit of water flowing from an aquatic animal tank 25 out through a horizontal pipe 245 to a adjustable water level control unit 249 and then on to an AWWC 35 where waste from the aquatic animals is mineralized. The cleaned water then flows to troughs 15 having floating trays that parts of plants above the water while the roots of the plants are in the water absorbing the mineralized fish waste. The further cleaned water is then pumped up back into the aquatic animal tank 25.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. An aquaponics system for producing both a plant product germinated from a seed and an animal product, the system comprising:

a waste conversion unit including a plurality of vertically stacked plates, each plate having a hole and an algae upon the plate, and a filter mesh located above the plurality of vertically stacked plates, wherein each plate includes a raised ridge extending upwards from a perimeter of the hole and the raised ridge is spaced from an outer perimeter of the plate to define a planar horizontal portion between the raised ridge and the outer perimeter of the plate, the planar horizontal portion adapted to facilitate the mineralization of animal waste by the algae retained on the planar horizontal portion of the plate;

a circuit of water that flows from an aquatic animal tank containing the animal product to the waste conversion unit, wherein the mineralized animal waste is carried by the circuit of water upwards through the holes in each of the plurality of vertically stacked plates then through the filter mesh to a first trough having a root of the plant product located within a portion of the circuit of water within the first trough, and returning to the aquatic animal tank, wherein the root of the plant product absorbs the mineralized animal waste; a tray floating upon the circuit of water within the first trough and supporting a portion of the plant product above the circuit of water, the tray including a flat surface surrounded by an elevated lip, a skirt extending down from the elevated lip into the circuit of water, and a plurality of tapered cones extending from the flat surface into the circuit of water, each of the plurality of cones having a lower opening, wherein the flat surface, the raised lip, the skirt, and the plurality of tapered cones form an air bubble region configured to trap air to provide buoyancy for the tray, and wherein the lower opening is located at one end of the tapered cone and is smaller than an upper opening of the tapered cone located at the flat surface, and the lower opening extends into and directly contacts the circuit of water; wherein the lower opening includes a size sufficient to prevent the seed from dropping through the lower opening but sufficient for the root of the plant product passing through the lower opening in one of the plurality of tapered cones; the waste conversion unit including a lamp providing illumination to the algae, a gas bubbler located below the plurality of vertically stacked plates for providing oxygen to the algae, a stream of nutrient fluid pumped into the waste conversion unit, and the plurality of vertically stacked plates includes at least four plates; the aquatic animal tank including a tapered bottom and bottom drain extending through the bottom through which the circuit of water flows to the waste conversion unit, and a vortex drain attachment in the aquatic animal tank adjacent to the tapered bottom and the bottom drain, the drain attachment having a plurality of fins extending away from a flat base, each of the plurality of fins having a concave side and a convex side, the flat base including a plurality of vortex openings through which the circuit of water flows, wherein each of the plurality of openings extend through the flat base, is located along the flat surface between the plurality of fins, wherein the vortex drain attachment includes a diameter to match the diameter of the aquatic animal tank; the animal product within the aquatic animal tank is an animal selected from an animal group consisting of a yellow perch, a bluegill, and a tilapia; and the plant product is a plant selected from a plant group consisting of a tomato, a cucumber, and a lettuce; an adjustable water level control unit including an inner vertical pipe having an open top, the inner vertical pipe secured to a horizontal pipe through a transition pipe, the inner vertical pipe vertically adjustable within the transition pipe, and an outer pipe enclosing the inner vertical pipe; wherein the circuit of water flows first, from a bottom drain in the aquatic animal tank, second, through the horizontal pipe, third, to the transition pipe, fourth, up the inner vertical pipe, fifth, out the open top of the of the vertical pipe, and sixth, down between the inner vertical pipe and the outer pipe.

2. The aquaponics system of claim 1 wherein
the first trough include a first modular section and a second modular section, each modular section including an edge and a basin through which the circuit of water flows, the basin having a flat bottom with both a first wall and a second wall extending upwards from the flat bottom;
a seam directly secured to and directly contacting the flat bottom, the first wall, and the second wall, the seam having an aperture; a mechanical fastener secured through both the aperture of the first modular section and the aperture of the second modular section;
a sealant between the seam of the first modular section and the seam of the second modular section, and
an automatic harvester disposed on the edge, the harvester configured to ride on the edge and to harvest the plant product.

3. The aquaponics system of claim 2 further comprising a side planter secured to the basin of the first modular unit above the first wall, the side planter including a water impermeable bottom, a screen side extending up from the water impermeable bottom, a plurality of pellets within the side planter, and a rooting vegetable having a root in the plurality of pellets.

4. The aquaponics system of claim 2 further comprising wherein the length, of the tray is substantially equal to the separation of the first wall from the second wall.

5. The aquaponies system of claim 2 further comprising a scavenging crustacean located in the circuit of water between the tray and the flat bottom of the basin for disposing of a dead root of the plant product.

6. The aquaponics system of claim 1 wherein
the first trough includes a basin through which the circuit of water flows;
a first U-slat oriented parallel to a second U-slat, each U-slat including a horizontal joist extending below the basin, a first stud and a second stud both flanking the basin, and the studs secured to and extending up from the horizontal joist;
a first stave, a second stave, and a third stave, all the staves having an equal length, a first end of the first stave directly contacting and secured to the horizontal joist of the first U-slat, a second end of the first stave directly contacting and secured to the horizontal joist of the second U-slat, a first end of the second stave directly contacting and secured to the first stud of the first U-slat, a second end of the second stave directly contacting and secured to the first stud of the second U-slat, a first end of the third stave directly contacting and secured to the second stud of the first U-slat, a second end of the third stave directly contacting and secured to the second stud of the second U-slat; and
a water impermeable plastic sheeting draped above U-slats and staves to form a portion of the basin.

7. The aquaponics system of claim 1 wherein
the circuit of water flows from the first trough through a trickle filter to the aquatic animal tank;
the trickle filter including an adsorbent material.

8. The aquaponics system of claim 1 further comprising a framework structure supporting an elevated second trough above the first trough;
wherein the circuit of water flows from the waste conversion unit through the second trough and then down to the first trough;
a first tray floating upon the circuit of water within the first trough, a second tray floating upon the circuit of water within the second trough, and each tray including a flat surface surrounded by an elevated lip, a skirt extending down from the elevated lip into the circuit of water, and a plurality of cones extending from the flat surface into the circuit of water, each of the plurality of cones having a lower opening at the bottom of the cone, wherein the lower opening includes a size sufficient to prevent the seed from dropping through the lower open but sufficient for the root of the plant product to pass through the lower opening of one of the plurality of cones.

9. The aquaponics system of claim 1 further comprising an automatic feeder positioned over the aquatic animal tank, the automatic feeder including a feed container with an adjustable opening, a shaking device secured to the feed container;
an optical sensor for measuring a disturbance upon a water surface following activation of the shaking device; and
a controller connecting to both the shaking device and the optical sensor, the controller activating the shaking device upon the expiration of a timer, and setting the timer based upon a measurement of the optical sensor.

* * * * *